United States Patent [19]

Cochran et al.

[11] Patent Number: 5,386,202
[45] Date of Patent: Jan. 31, 1995

[54] DATA COMMUNICATION MODULATION WITH MANAGED INTERSYMBOL INTERFERENCE

[75] Inventors: Bruce A. Cochran, Mesa; Ronald D. McCallister, Scottsdale, both of Ariz.

[73] Assignee: Sicom, Inc., Scottsdale, Ariz.

[21] Appl. No.: 146,925

[22] Filed: Nov. 3, 1993

[51] Int. Cl.⁶ ............... H03C 3/00; H03D 3/00; H04L 27/10; H04L 1/00
[52] U.S. Cl. ............... 332/100; 332/103; 329/300; 329/304; 375/45; 375/46; 375/51; 375/52; 375/57; 375/60; 375/62; 375/67
[58] Field of Search ............... 332/100–105; 329/300–310; 375/44–67

[56] References Cited

U.S. PATENT DOCUMENTS

| | | | |
|---|---|---|---|
| 4,672,634 | 6/1987 | Chung et al. | 375/62 |
| 5,048,058 | 9/1991 | Kaleh | 375/47 |
| 5,097,220 | 3/1992 | Shimakata et al. | 329/306 |
| 5,121,412 | 6/1992 | Borth | 375/67 |

OTHER PUBLICATIONS

Thesken, Teresa Marie, "Trellis–Coded Continuous-–Phase Modulation with Differential Detection and Procoding" U. of California, Los Angeles, Dissertation 1989.

I. Korn, "GMSK with Differential Phase Detection in the Satellite Mobile Channel", IEEE Transactions on Communications, vol. 38, No. 11, Nov. 1990, pp. 1980–1986.

Harashima, Hiroshi and Miyakawa, Hiroshi, "Matched-Transmission Technique for Channels with Intersymbol Interference", IEEE Transactions on Communications, vol. COM-20, No. 4, Aug. 1972, pp. 774–780.

Murota, Kazuaki, "GMSK Modulation for Digital Mobile Radio Telephony", IEEE Transactions on Communications, vol. COM-29, No. 7, Jul. 1991, pp. 1044–1050.

Forney, G. David, Jr. and Eyuboglu, M. Vedat, "Combined Equalization and Coding Using Precoding", IEEE Communications Magazine, Dec. 1991, pp. 25–34.

*Primary Examiner*—David Mis
*Attorney, Agent, or Firm*—Lowell W. Gresham; Jordan M. Meschkow

[57] ABSTRACT

A communication system (10) includes a modulation section (12) and a demodulation section (14). The modulation section (12) performs frequency modulation in accordance with a frequency trajectory signal (28, 30, 32). An intersymbol interference (ISI) prediction filter (20) adjusts the amplitude of the frequency trajectory signal (28, 30, 32) in response to data code (16) sequences being conveyed over a plurality of symbols (18). More frequent data changes in the sequence of the data codes (16) lead to greater amplitudes in the frequency trajectory signal. The demodulation section (14) applies a distorted phase signal to a decision circuit (38). The distorted phase signal conveys a received phase (46) that includes ISI. Due to the equalization applied by the ISI prediction filter (20), the received phase (46) approximates a target phase (40, 42) in spite of the ISI.

23 Claims, 4 Drawing Sheets

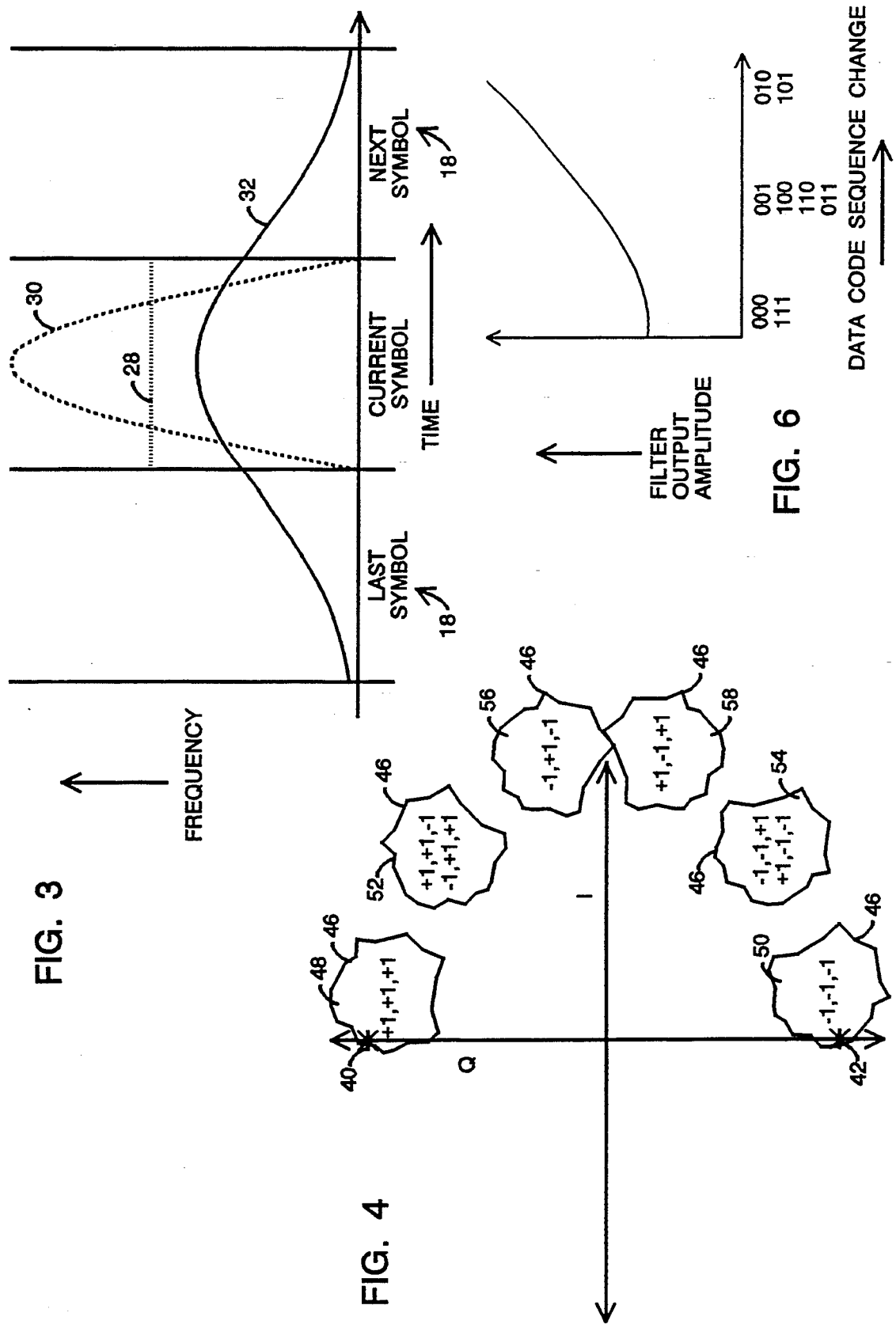

DATA COMMUNICATION MODULATION WITH MANAGED INTERSYMBOL INTERFERENCE

TECHNICAL FIELD OF THE INVENTION

The present invention relates generally to data communications. More specifically, the present invention relates to data communication systems which employ robust and spectrally efficient frequency modulation schemes.

BACKGROUND OF THE INVENTION

Data communication systems need to accurately communicate as much data as possible within a constrained amount of frequency spectrum. This goal may be achieved by increasing the number of bits conveyed during any single symbol and/or by reducing the spectrum required to transmit successive symbols. The Nyquist class of pulse shapes minimize the spectrum required to transmit symbols, and these pulse shapes may be applied to higher-order QAM modulation schemes to convey a large number of bits per symbol. Nyquist pulses exhibit an amplitude of zero at a set of equally spaced time instants. By precisely positioning the zero points, intersymbol interference (ISI) and the severe performance degradation typically associated therewith may be avoided. While Nyquist pulses offer spectral efficiency, overall performance is highly sensitive to pulse shape. Any slight deviation from a precise Nyquist shape introduces catastrophic performance degradation. Due at least in part to this high sensitivity to pulse shape, the use of Nyquist pulses is conventionally limited to situations where a communication link's characteristics are precisely known and stable, such as in the telephony systems' land lines.

However, in mobile communications and other RF broadcast and free-space communication situations the communication links' characteristics vary dynamically and unpredictably. Nyquist pulse shaping schemes are typically far too frail for use in connection with free-space communication applications. Even slight multipathing can alter the Nyquist pulse shape enough to result in catastrophic performance degradation.

In addition, QAM modulation schemes employ amplitude modulation. When a QAM-modulated waveform passes through a power amplifier prior to transmission, this amplitude modulation is reproduced by the power amplifier. Desirably, the amplifier has a generally linear amplitude response so that the amplitude modulation is reproduced and so that a spectral regrowth phenomenon is avoided. The spectral regrowth phenomenon results from non-linear amplification and causes spectral energy to be regenerated outside the pass band of the amplifier's input signal.

In typical free-space communication systems, equipment expense and power consumption are important design parameters. Often times, these design parameters lead to the selection of transmitter high power amplifiers which consume a maximum amount of power at all input amplitudes and which exhibit a non-linear amplitude response near a saturation level. In other words, when operated at maximum power efficiency, the transmitter high power amplifiers have a non-linear amplitude response which is unsuitable for QAM. When operated in a linear range, the transmitter high power amplifiers exhibit serious inefficiencies in power consumption. Consequently, the linear amplification requirement of QAM forces the user to waste available transmitter power.

Desirable robustness and spectral efficiencies may be achieved through the use of modulation schemes that minimize amplitude modulation and force modulation signal phase changes to take place rather slowly. The minimization of amplitude modulation permits the use of high power amplifiers that exhibit non-linear amplitude responses. Consequently, desirable transmitter high power amplifiers may be used at maximum power efficiency.

A family of constant envelope (CE) frequency modulation schemes, including minimum shift keying (MSK), sinusoidal frequency shift keying (SFSK), Gaussian minimum shift keying (GMSK), and the like, minimize amplitude modulation and may force modulation signal phase changes to take place slowly. Of these frequency modulation schemes, GMSK appears to be the most spectrally efficient and otherwise desirable. These CE modulation schemes exhibit stable, robust performance characteristics which are well suited for the unpredictable and dynamic nature of free-space communication links.

Unfortunately, these CE modulation schemes suffer greatly from the detrimental consequences of intersymbol interference (ISI). These consequences include either a significant increase in bit error rate or a prohibitively complex receiver structure. Conventionally, the degradation in performance caused by the ISI associated with CE modulation schemes is so severe that the CE schemes are unable to accurately communicate data at higher orders, where multiple bits of data are transmitted during each symbol.

ISI is also experienced in QAM systems, although to a lesser extent. Attempts have been made to precode the data in QAM systems in an attempt to reduce the effects of ISI. However, these attempts require the modulation of amplitude. The amplitude modulation associated with amplitude precoding results in either an increased bandwidth or an ineffective solution when used with non-linear amplifiers.

SUMMARY OF THE INVENTION

Accordingly, it is an advantage of the present invention that an improved modulator and method for modulating data communications are provided.

Another advantage of the present invention is that a modulator is provided which achieves robustness and high spectral efficiency.

Another advantage is that the present invention provides a modulator which manages ISI so that the detrimental consequences of ISI may be avoided.

Another advantage is that the present invention provides a modulator whose modulated signals may be demodulated using conventional phase-related demodulation techniques.

Another advantage is that the present invention provides a robust, spectrally efficient frequency modulator that accurately communicates at higher modulation orders.

Another advantage is that the present invention is compatible with Trellis-coded-modulation (TCM) techniques, which exploit higher-order modulation to further increase spectral efficiency.

Another advantage is that the present invention accurately communicates a greater amount of data using a given amount of spectrum.

Another advantage is that the present invention uses transmission power that is wasted in QAM modulation schemes to increase data throughput and/or improve spectral efficiency.

Another advantage is that the present invention improves upon the frailness exhibited by QAM in free-space communications.

The above and other advantages of the present invention are carried out in one form by a method for modulating data communications. The method calls for obtaining a first data code to be communicated during a first symbol and a second data code to be communicated during a second symbol. Intersymbol interference between the first and second symbols is predicted in response to the first and second data codes. A trajectory signal is generated. The trajectory signal is responsive to at least one of the first and second data codes and to the predicted intersymbol interference. A carrier's frequency is changed in response to the trajectory signal.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 3 shows a plot of various frequency trajectories which may result from a pulse input;

FIG. 4 shows a phase node plot illustrating typical intersymbol interference (ISI) encountered in connection with a spectrally efficient, binary ordered, modulation scheme when no ISI weighting is performed;

FIG. 6 shows an exemplary response plot of a prediction filter portion of the communication system;

DETAILED DESCRIPTION OF THE PREFERRED EMBODIMENTS

Figure 1:
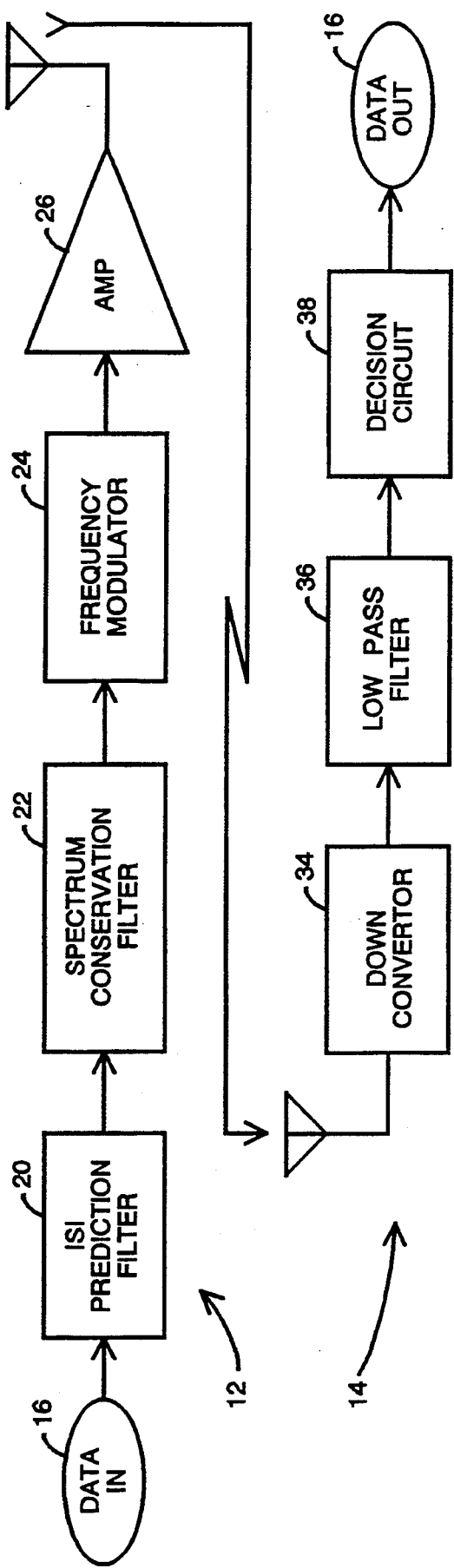
FIG. 1 shows a block diagram of a data communication system configured in accordance with the teaching of the present invention.

FIG. 1 shows a block diagram of a data communication system 10. System 10 includes a modulation section 12 and a demodulation section 14. Modulation section 12 receives a stream of data codes 16, as illustrated in the timing diagram presented in FIG. 2. Each data code 16 may include one and preferably more bits of data. Thus, the present invention operates with binary or preferably with higher modulation orders. Each data code 16 is conveyed during a baud or symbol interval, hereinafter referred to as a symbol 18.

Referring back to FIG. 1, data codes 16 are routed to an intersymbol interference (ISI) prediction filter 20. Filter 20 generates a stream of ISI-adjusted data codes in response to data codes 16. Filter 20 generates one ISI-adjusted data code for each received data code 16.

Figure 2:
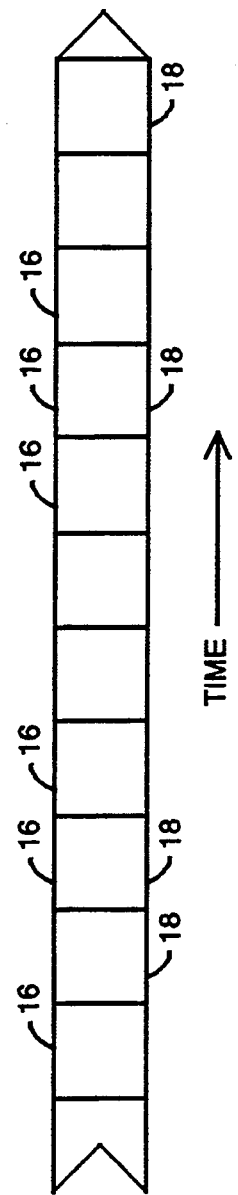
FIG. 2 shows a timing diagram depicting a stream of data codes communicated by the system.

However, the ISI-adjusted data codes exhibit amplitude values that are responsive to data codes 16 for immediately previous and upcoming symbols 18 (see FIG. 2). The ISI-adjusted data codes are routed to a spectrum conservation filter 22. Filter 22 generates a frequency trajectory signal that drives a frequency modulator 24. The trajectory signal defines the manner in which the frequency and therefore phase of a carrier signal changes in time throughout symbols 18 (see FIG. 2). An amplifier 26 amplifies the modulated carrier signal and transmits the carrier signal from modulation section 12. In the preferred embodiments of the present invention, this transmission occurs through free-space.

FIG. 3 shows a timing plot of various trajectory signals which various embodiments of spectrum conservation filter 22 may generate in response to a pulse input (not shown) having a duration approximately equal to a symbol 18. Those skilled in the art will appreciate that the ISI-adjusted data codes received by filter 22 represent such pulses, except that polarity and magnitude may change from symbol 18 to symbol 18. For clarity, FIG. 3 shows the response of filter 22 to a single pulse rather than a stream of pulses.

An MSK trajectory signal 28 resembles a pulse itself. Substantially all the input pulse's energy is output during a single symbol 18. In fact, MSK trajectory signal 28 may result from the omission of filter 22. In response to MSK trajectory signal 28, the carrier signal generated by modulator 24 (see FIG. 1) makes discontinuous step changes at the beginning and end of a symbol 18, and does not substantially change over the duration of the symbol. In other words, the slope of MSK trajectory signal 28 changes over the duration of a symbol 18, and about all the slope change is concentrated in slope discontinuities residing at the beginning and end of the symbol 18.

A carrier signal whose frequency changes in correspondence with MSK trajectory signal 28, exhibits much improved spectral occupancy or efficiency compared to M-PSK modulation schemes and much improved robustness when compared to QAM schemes. MSK trajectory signal 28 describes a constant envelope (CE) in which amplitude changes in the transmitted signal are minimized. Amplifier 26 (see FIG. 1) may be realized using a class C amplifier, or other nonlinear amplification device operating at maximum power efficiency. Such an amplifier does not expand the bandwidth of the modulated carrier signal as occurs in QAM modulation schemes, and such an amplifier is a desirable selection in mobile communication situations for cost and other considerations.

SFSK trajectory signal 30 provides an improvement in spectral efficiency over MSK trajectory signal 28. Substantially all the input pulse's energy is output during a single symbol 18. In response to SFSK trajectory signal 30, the carrier signal generated by modulator 24 (see FIG. 1) generally distributes frequency change over the duration of the symbol. In other words, the slope of SFSK trajectory signal 30 changes over the duration of a symbol 18.

The integral of the trajectory signal over the duration of a symbol 18 corresponds to the amount of phase change effected in the carrier signal as a result of frequency changes. In other words, the area under the trajectory signal curve defines phase change. Since SFSK trajectory signal 30 does not change its frequency as abruptly as MSK trajectory signal 28, it must experience a greater overall frequency swing to achieve the same amount of phase change.

Another way to achieve a given amount of phase change is to change frequency slowly and over a longer duration. This technique is illustrated by Gaussian MSK (GMSK) trajectory signal 32. GMSK trajectory signal 32 provides an improvement in spectral efficiency over MSK and SFSK trajectory signals 28 and 30. GMSK trajectory signal 32 provides gradual rather than abrupt changes in the carrier's frequency and a small overall frequency swing. GMSK trajectory signal 32 distributes the slope or change in frequency over the duration of a plurality of symbols. Desirably, the response is spread over a number of symbols 18 so that around 50% to 75% of the total phase change occurs in a single symbol, referred to as the current symbol in FIG. 3.

The spreading of trajectory signal 32 over several symbols 18 in response to a one-symbol duration input pulse, and the distribution of the slope for trajectory signal 32 roughly equally over this duration lead to excellent spectral efficiency and robustness. In other words, a very large percentage of the power of the transmitted carrier signal remains in a narrow bandwidth. However, those skilled in the art will appreciate that ISI is a consequence of spreading frequency change for a single symbol 18 over several symbols 18. In particular, the amount of phase change experienced by a carrier signal during any one symbol 18 is the result of a partial response from the input pulse for the current symbol, combined with a partial response from the next symbol's input pulse, a partial response from the last symbol's input pulse, and possibly partial responses from input pulses for other symbols 18.

Of the three trajectory signals 28, 30, and 32 illustrated in FIG. 3, GMSK trajectory signal 32 is the most preferred for use in connection with the present invention due to its excellent spectral efficiency and robustness. However, the principles of the present invention may be applied equally well when filter 22 (see FIG. 1) has a response that produces trajectory signals 28 and 30. Moreover, responses other than the above-discussed Gaussian response for filter 22 may still produce beneficial results. Generally speaking, such responses are spread over a plurality of symbols so that the trajectory signal during any one symbol is responsive to data codes 16 (see FIGS. 1–2) for a plurality of symbols 18. In addition, such responses distribute changes in trajectory signal slope generally equally through the duration of the symbols in a continuous manner rather than permit significant discontinuities.

Referring back to FIG. 1, demodulation section 14 of system 10 may represent a conventional phase-related demodulator. Thus, demodulation section 14 includes a down convertor 34 that receives the modulated carrier transmitted from modulation section 12 and translates this signal to baseband. The baseband signal is routed to a low pass filter 36. Low pass filter 36 is included to reduce noise. Typically, filter 36 has a bandwidth approximately equal to the symbol rate or perhaps slightly more or less than the symbol rate.

This heavy filtering is another source of ISI in system 10. Regardless of whether filter 22 causes ISI by spreading trajectory signal responses over a plurality of symbols 18, filter 36 produces a distorted phase signal which exhibits phase information during each symbol 18 that is responsive to data being conveyed in more than one symbol 18. The portion of ISI generated by filter 36 is more pronounced when the signals being filtered experience greater amounts of phase change during a single symbol 18. Thus, MSK and SFSK trajectory signals 28 and 30 (see FIG. 3) lead to greater ISI from filter 36 even though they introduce little ISI at modulation section 12. While GMSK trajectory signal 32 (see FIG. 3) introduces ISI at modulation section 12, it experiences less ISI from filter 36. As a consequence, the ISI included in the distorted phase signal generated by filter 36 is not exceedingly sensitive to the filtering performed by filter 22 in modulation section 12.

The distorted phase signal from filter 36 is routed to a decision circuit 38. Decision circuit 38 re-creates data codes 16 from the distorted phase signal. Decision circuit 38 employs a maximum likelihood or other decision statistic that determines which of a number of predetermined discrete target phases the phase of the distorted phase signal most closely resembles.

Figure 5:
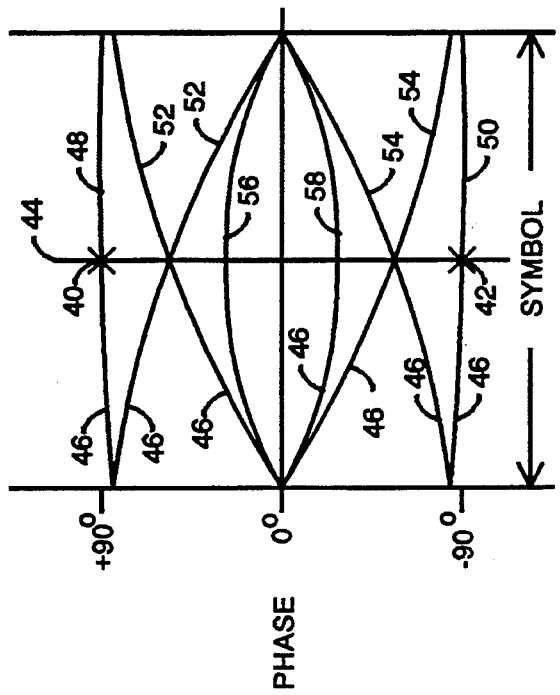
FIG. 5 shows an eye diagram illustrating typical ISI encountered in connection with a spectrally efficient, binary ordered, modulation scheme when no ISI weighting is performed.

FIG. 4 shows an exemplary phase node plot illustrating typical intersymbol interference (ISI) encountered in connection with a spectrally efficient, binary ordered, modulation scheme when no ISI weighting is performed by ISI prediction filter 20. ISI prediction and weighting and the effects thereof are discussed below. FIG. 5 shows similar data in an eye diagram form. Those skilled in the art will appreciate that FIGS. 4–5 illustrate only a binary ordered modulation scheme for the sake of clarity and that the principles of the present invention apply to higher modulation orders. In fact, higher modulation orders are preferred because they achieve higher data rates without increasing spectral occupancy.

Moreover, higher modulation orders permit the use of Trellis-coded-modulation (TCM). TCM exploits higher order modulation to increase the performance of a link. Generally speaking, any $2^N$-order modulation can potentially convey N bits per symbol. TCM dedicates a subset of the $2^N$ transmission states to correcting errors rather than to conveying data. As a result of the error correction, TCM makes it possible to achieve a significant increase in data rate with no increase in transmitter power, spectral bandwidth, or bit error rate (BER). TCM modulation techniques are known in the art and are not discussed further herein.

Referring to FIGS. 4–5, a binary order modulation scheme may have two predetermined target phases 40 and 42 located at ±90°. Decision circuit 38 (see FIG. 1) will conclude that a received phase 46 is communicating a first state, referred to as "+1" when it is closer to target phase 40 than any other target phase, namely target phase 42. Decision circuit 38 will conclude that received phase 46 is communicating a second state, referred to as "−1" when it is closer to target phase 42.

If the distorted phase signal is examined at maximum eye opening 44 during symbols 18, received phases 46 spread throughout the ±90° range may be observed. Received phase 46 is spread throughout this range due to several influences, but predominantly due to ISI. The amount of ISI experienced depends upon the states of data codes 16 (see FIGS. 1–2) being conveyed in preceding and following symbols 18.

The more change that occurs in received phase 46 over the course of several symbols 18, the greater the ISI. As illustrated in FIGS. 4–5, a data code sequence 48 of +1, +1, +1 and a data code sequence 50 of −1, −1, −1 result in little ISI. Virtually no change in received phase 46 is required to communicate the middle code of the sequence. Data code sequences 52 of +1, +1, −1 or −1, +1, +1 and data code sequences 54 of −1, −1, +1 or +1, −1, −1 result in a moderate amount of ISI. A 180° change in received phase 46 is required either approaching or leaving the middle code of the sequence. On the other hand, a data code sequence 56 of −1, +1, −1 and a data code sequence 58 of +1, −1, +1 result in a large amount of ISI. This 180° change in received phase 46 is required both approaching and leaving the middle code of the sequence.

The same results are experienced at higher modulation orders. However, at higher modulation orders a greater number of target phases are used and smaller amounts of phase changes are encountered in communicating data codes 16. Consequently, without ISI prediction and weighting, ISI blurs the differences between received phases 46 and their corresponding target phases, and decision circuit 38 (see FIG. 1) can be expected to make a significant number of mistakes in re-creating data codes 16.

Referring back to FIG. 1, ISI prediction filter 20 predicts the ISI which will be encountered at the input to decision circuit 38 and adjusts amplitudes or gains as needed to cause received phase 46 to more closely resemble its corresponding target phase. The effect of adjusting an amplitude or gain at filter 20 is an adjustment to the frequency or phase trajectory of the carrier wave transmitted from modulator 12. No carrier amplitude modulation results. In other words, the ISI weighting performed by ISI prediction filter 20 alters the performance of modulator 12 in the phase or frequency domain rather than the amplitude domain. Consequently, the constant envelope characteristics of the modulation constellation are unchanged, and nothing prevents the use of efficient, nonlinear transmitter power amplifiers 26.

As discussed above, when little change is present in data codes 16, little ISI will be present in received phase 46. Thus, in this situation filter 20 needs to make little adjustment. However, when greater change is present in data codes 16, a greater amount of ISI is present. In this situation, filter 20 needs to make more adjustment. The greater amount of ISI leads to phase changes from prior received phases 46 that are not great enough to cause a current received phase 46 (see FIGS. 4-5) to equal a desired target phase. Hence, the adjustment desirably leads to greater phase changes.

FIG. 6 shows an exemplary response plot for ISI prediction filter 20. Generally speaking, filter 20 outputs an ISI-adjusted data code. The amplitude of the filter output data increases as changes in the data sequences being conveyed by data codes 16 increase. In other words, the ISI-adjusted data codes' amplitudes are increased from that of data codes 16 when data codes 16 are changing, and the amount of amplification is increased as the amount of data change increases. The selective amplification provided by filter 20 leads to trajectory signals 28, 30, and 32 (see FIG. 3) whose amplitudes likewise vary with changes in data codes 16. Greater amplitudes for trajectory signals 28, 30, and 32 cause greater amounts of phase change effected by the carrier.

Those skilled in the art will appreciate that the adjustment in filter 20 to amplitudes conveyed by data codes 16 need not be expressed using the same degree of precision that is used to convey data codes 16. For example, if each data code 16 is expressed as a two bit value, the output from filter 20 for each symbol 18 may be expressed in, for example, four, six, or more bits. In an alternative embodiment, the output may be expressed as an analog signal.

The precise parameters of filter 20 are not important in the present invention and may change from application to application. These parameters may be determined empirically by measuring ISI at the input to decision circuit 38. For example, system 10 may first be built or simulated without filter 20, and a single pulse sent through a real or simulated system 10. The response to this single pulse may be measured at the input to decision circuit 38. The measured response will indicate pulse energy spread over more than one symbol 18 due to ISI. From this measured response, those skilled in the art may use conventional filter design techniques to design a filter 20 that, when inserted in system 10, causes the vast majority of the response pulse energy to appear in a single symbol 18. In an alternative embodiment, the parameters of filter 20 may simply be estimated.

Figure 7:
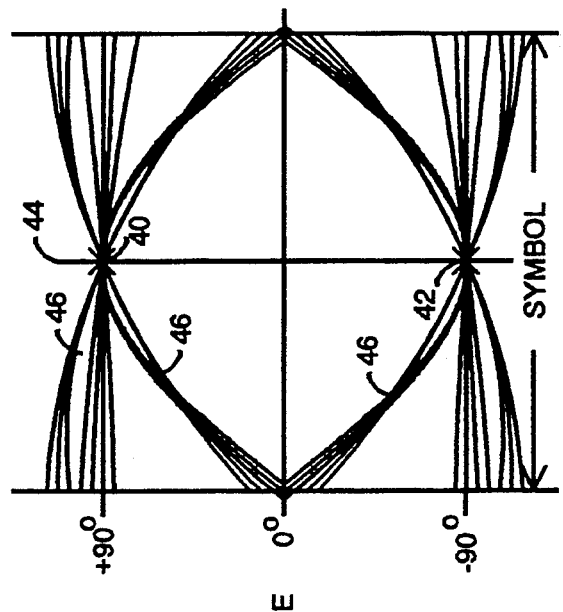
FIG. 7 shows an eye diagram illustrating an exemplary spectrally efficient, binary ordered, modulation scheme when ISI weighting is performed in accordance with the teaching of the present invention.

FIG. 7 shows an eye diagram illustrating an exemplary spectrally efficient, binary ordered, modulation scheme when ISI weighing is performed by ISI prediction filter 20. If the distorted phase signal generated by filter 36 (see FIG. 1) is examined at maximum eye opening 44 during symbols 18, received phases 46 are not spread throughout the ±90° range, as shown above in FIG. 5. Rather, at maximum eye opening 44 received phases 46 converge at target phases 40 and 42. ISI has been managed so that contributions to the received phase 46 in a current symbol 18 from data conveyed in previous and subsequent symbols 18, when combined with the current symbol's contribution to received phase 46, more closely yield a target phase 40 or 42. As a result of close approximation between received phases 46 and target phases, decision circuit 38 may make more accurate decisions, and the bit error rate decreases.

An ISI prediction filter 20 may be designed to cause received phases 46 to approximate target phases with varying degrees of precision. By causing very tight approximations between received phases 46 and target phases, higher orders of modulation, such as 4-ary, 8-ary, and higher, may be achieved because more distinguishable target phases can be included in a constellation. In addition, TCM may be employed with the higher orders of modulation to further improve performance.

One consequence of very precise approximations between received phases 46 and target phases may be a minor degradation in spectral efficiency. By designing a filter 20 to cause received phases 46 to loosely approximate target phases, even this minor degradation in spectral efficiency may be lessened.

Figure 8:
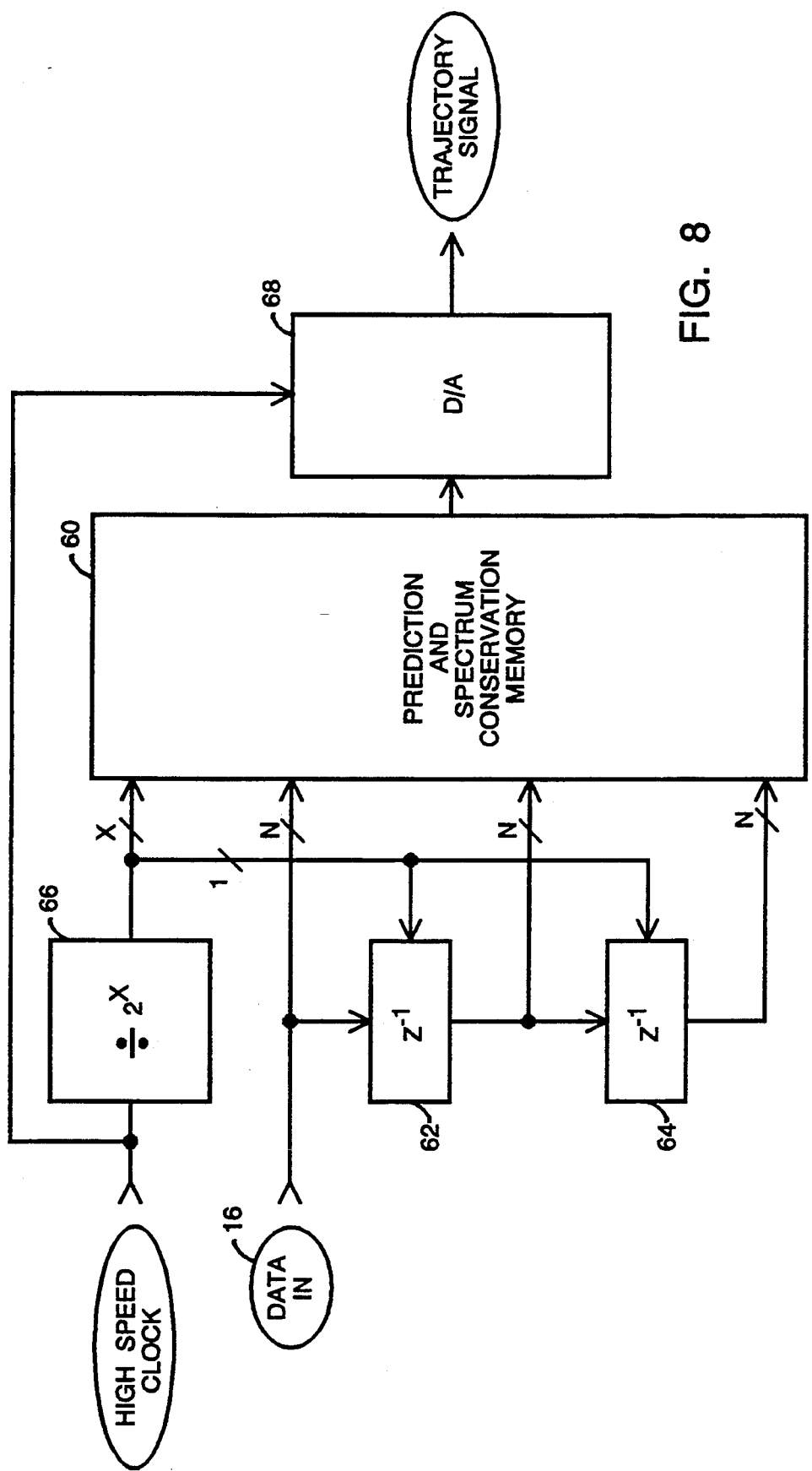
FIG. 8 shows an alternate embodiment of a trajectory signal generation section of a modulator portion of the communication system.

Those skilled in the art will appreciate that the present invention may be practiced in numerous diverse forms. For example, FIG. 8 shows an alternate embodiment of a trajectory signal generation portion of modulation section 12 (see FIG. 1). The FIG. 8 embodiment implements an M-ary modulation scheme, where M equals $2^N$. N-bit data codes 16 are applied to a first N address bits of a prediction and spectrum conservation memory 60 and to a delay circuit 62. An output of delay circuit 62 applies N-bit data codes to a second N address bits of memory 60 and to a delay circuit 64. An output of delay circuit 64 applies N-bit data codes to a third N address bits of memory 60.

A high speed clock drives a dividing circuit or counter 66. Desirably, the high speed clock has a frequency that is several times the symbol rate. Counter 66 divides the high speed clock, perhaps by $2^x$, and applies an X-bit code to other address bits of memory 60. If, for example, the FIG. 8 embodiment implements an 8-ary modulation scheme and the high speed clock is eight times the symbol rate, then memory 60 need include only 4096 words of data. The output of memory 60 drives a digital-to-analog convertor (D/A) 68, and the output of D/A 68 provides the trajectory signal, such as signals 28, 30, or 32 (see FIG. 3). Desirably, the most significant bit of the X-bit code from counter 66 oscillates at the symbol rate, and this bit is used as a clock for delay circuits 62 and 64. The high speed clock may serve as a clock for D/A 68.

In comparing the FIG. 8 embodiment of the present invention with the FIG. 1 embodiment, the function of filters 20 and 22 (see FIG. 1) have been combined and implemented in a look-up table in memory 60. Thus, filters 20 and 22 need not be separate devices, and their functions need not be performed by traditional filters. Memory 60 generates codes whose values correspond to the shape of trajectory signals 28, 30, or 32 (see FIG.3) and whose amplitudes vary in response to data codes 16 from a plurality of symbols 18.

In summary, the present invention provides an improved modulator and method for modulating data communications. A modulator is provided which achieves robustness with high spectral efficiency. The robustness and high spectral efficiency are achieved by using frequency modulation rather than amplitude modulation. Additional efficiencies may be achieved by changing frequency throughout the symbols smoothly and continuously rather than abruptly. Even greater efficiencies may be achieved by spreading frequency changes associated with a changing data code for any one symbol over a plurality of symbols.

The present invention provides a modulator which manages ISI so that the detrimental consequences of ISI, such as high bit error rates, may be avoided. A conventional phase-related demodulator may be used to demodulate data encoded by the modulator. An ISI prediction filter in the modulator adjusts modulation frequency trajectories so that phase changes achieved from symbol to symbol after experiencing ISI cause the received phases at a decision circuit in the demodulator to closely approximate target phases. Since the received phases closely approximate target phases, accurate communications at higher modulation orders may occur. The accommodation of higher modulation orders permits the use of Trellis-coded-modulation (TCM) for further performance improvements. Since robustness and spectral efficiency are achieved with high order modulation, greater amounts of data may be accurately communicated in a given amount of spectrum by the present invention.

When compared to QAM, power that would be wasted in a mobile communications power amplifier may now be used because substantially no amplitude modulation is required. This otherwise wasted power may be put to use to increase data throughput and/or improve spectral efficiency. Moreover, the constant envelope (CE) modulation of the present invention improves upon the frailness exhibited by QAM in free-space communication applications.

The present invention has been described above with reference to preferred embodiments. However, those skilled in the art will recognize that changes and modifications may be made in these preferred embodiments without departing from the scope of the present invention. For example, the precise filter parameters, filter responses, and degree to which received phases approximate target phases may vary from application to application. Changes and modifications which achieve these and other variations will be obvious to those skilled in the art and are intended to be included within the scope of the present invention.

What is claimed is:

1. A method for modulating data communications comprising the steps of:
   obtaining a first data code to be communicated during a first symbol and a second data code to be communicated during a second symbol;
   predicting intersymbol interference between said first and second symbols in response to said first and second data codes;
   generating a trajectory signal which is responsive to at least one of said first and second data codes and to said predicted intersymbol interference; and
   changing a carrier frequency in response to said trajectory signal.

2. A method for modulating data communications as claimed in claim 1 wherein:
   said first and second data codes are obtained from a stream of data codes; and
   said predicting step comprises the step of filtering said stream of data codes.

3. A method for modulating data communications as claimed in claim 2 wherein:
   said filtering step generates a stream of ISI-adjusted data codes; and
   said generating step comprises the step of filtering said ISI-adjusted data codes.

4. A method for modulating data communications as claimed in claim 1 wherein:
   said first and second data codes are included in a stream of symbols, where each symbol conveys a single data code; and
   said generating step causes said trajectory signal during any one symbol to be responsive to said data codes for a plurality of symbols.

5. A method for modulating data communications as claimed in claim 4 wherein said generating step additionally comprises the step of filtering said first and second data codes through a filter that has an approximately Gaussian response.

6. A method for modulating data communications as claimed in claim 4 wherein:
   said generating step is responsible for a first portion of said intersymbol interference;
   said carrier frequency is detected at a receiver having a low pass filter which is responsible for a second portion of said intersymbol interference; and
   said predicting step predicts a combination of said first and second portions of said intersymbol interference.

7. A method for modulating data communications as claimed in claim 1 wherein:
   said trajectory signal exhibits a slope which changes over the course of said first symbol; and
   said generating step comprises the step of distributing said change in trajectory signal slope generally equally throughout the duration of said first symbol.

8. A method for modulating data communications as claimed in claim 1 wherein:
   said first and second data codes are obtained from a stream of data codes; and each of said data codes in said stream conveys more than one bit of data.

9. A method for modulating data communications as claimed in claim 1 wherein:
said carrier frequency is detected at a receiver having a low pass filter which generates at least a portion of said intersymbol interference; and
said predicting step predicts said portion of said intersymbol interference.

10. A method for modulating data communications as claimed in claim 1 additionally comprising the step of amplifying said carrier frequency with a non-linear power amplifier.

11. A method for communicating data at a low bit error rate with high spectral efficiency, said method comprising the steps of:
a) filtering a stream of data codes to generate a trajectory signal, each of said data codes being conveyed during a symbol;
b) modulating a carrier frequency in response to said trajectory signal;
c) translating said modulated carrier into a baseband signal;
d) filtering said baseband signal to generate a distorted phase signal, said distorted phase signal exhibiting a phase during each of said symbols that is responsive to data conveyed during at least one other symbol; and
e) estimating said stream of data codes in response to said distorted phase signal by employing a decision statistic which associates data codes with predetermined discrete phases;
wherein said step a) is configured to shape said trajectory signal so that said distorted phase signal of said step d) exhibits a phase at a common point during each symbol that approximates one of said predetermined phases.

12. A method for communicating data as claimed in claim 11 wherein said step a) is further configured to shape said trajectory signal so that during each of said symbols said trajectory signal is responsive to data being conveyed during at least one other symbol.

13. A method for communicating data as claimed in claim 11 wherein:
said step a) is further configured to shape said trajectory signal so that said trajectory signal exhibits an approximately Gaussian response to said data codes, and so that during each of said symbols said trajectory signal is responsive to a data code being conveyed during at least one other symbol.

14. A method for communicating data as claimed in claim 11 wherein:
said trajectory signal shape exhibits a slope which changes over the course of each symbol; and
said step a) comprises the step of distributing said change in trajectory signal slope generally equally throughout the duration of each symbol.

15. A method for communicating data as claimed in claim 11 wherein each of said data codes conveys more than one bit of data.

16. A method for communicating data as claimed in claim 11 wherein said trajectory signal shape exhibits a slope which changes over the course of each symbol, and said step a) comprises the steps of:

filtering said stream of data codes to generate a stream of ISI-adjusted data codes; and
filtering said stream of said ISI-adjusted data codes through a filter which causes said trajectory signal during each of said symbols to be responsive to data being conveyed during at least one other symbol, and which distributes said change in trajectory signal slope generally equally throughout the duration of each symbol.

17. A method for communicating data as claimed in claim 11 additionally comprising the step of amplifying said carrier frequency with a non-linear power amplifier.

18. A data communication modulator which manages intersymbol interference, comprising:
means for obtaining a first data code to be communicated during a first symbol and a second data code to be communicated during a second symbol;
a filter coupled to said obtaining means, said filter being configured to predict intersymbol interference between said first and second symbols in response to said first and second data codes and to generate a trajectory signal which is responsive to at least one of said first and second data codes and to said predicted intersymbol interference; and
means, coupled to said filter means, for changing a carrier frequency in response to said trajectory signal.

19. A data communication modulator as claimed in claim 18 wherein:
said first and second data codes are included in a stream of symbols, where each symbol conveys a single data code; and
said filter is configured to cause said trajectory signal during any one symbol to be responsive to said data codes for a plurality of symbols.

20. A data communication modulator as claimed in claim 19 wherein:
said filter introduces a first portion of said intersymbol interference;
said carrier frequency is detected at a receiver having a low pass filter which introduces a second portion of said intersymbol interference; and
said filter is further configured to predict a combination of said first and second portions of said intersymbol interference.

21. A data communication modulator as claimed in claim 18 wherein:
said first and second data codes are obtained from a stream of data codes; and
said obtaining and filtering means are each configured so that each of said data codes in said stream conveys more than one bit of data.

22. A data communication modulator as claimed in claim 18 wherein:
said trajectory signal exhibits a slope which changes over the course of said first symbol; and
said filter is configured to distribute said change in trajectory signal slope generally equally throughout the duration of said first symbol.

23. A data communication modulator as claimed in claim 18 additionally comprising a non-linear power amplifier having an input coupled to said changing means.

* * * * *